United States Patent [19]

Cope

[11] Patent Number: 4,609,497

[45] Date of Patent: Sep. 2, 1986

[54] PROCESS FOR SEPARATING SURFACTANTS USED IN THE MANUFACTURE OF CONCENTRATED FLUOROPOLYMER DISPERSIONS

[75] Inventor: Charles S. Cope, Parkersburg, W. Va.

[73] Assignee: E. I. Du Pont de Nemours and Company, Wilmington, Del.

[21] Appl. No.: 711,834

[22] Filed: Mar. 14, 1985

[51] Int. Cl.[4] .................... C07B 53/21; C09F 7/00; C11C 3/00
[52] U.S. Cl. ................................ 260/408; 562/605
[58] Field of Search .................. 260/408; 562/605

[56] References Cited

U.S. PATENT DOCUMENTS

| | | | |
|---|---|---|---|
| 2,863,889 | 12/1958 | Marks | 260/408 |
| 2,948,741 | 8/1960 | Barnhart et al. | 260/408 |
| 4,282,162 | 8/1981 | Kuhls | 260/408 |

OTHER PUBLICATIONS

Kirk-Othmer, *Encyclopedia of Chemical Technology*, 3rd Edition, vol. 7, (1979), pp. 881-883.
Kirk-Othmer, *Encyclopedia of Chemical Technology*, vol. 2, 1963, pp. 51-52.

*Primary Examiner*—Charles F. Warren
*Assistant Examiner*—Elizabeth A. Flaherty

[57] ABSTRACT

A process for separting the ammonium salt of a selected fluoroalkanoic acid from a selected hydrocarbyl oxyethoxylated polyether which comprises:

A. extracting the ammonium salt (in the form of its corresponding acid) and the ethoxylated compound from an acidified aqueous mixture by agitating with a selected organic liquid and separating the organic liquid layer, B.1) contacting said organic liquid layer with activated alumina, B.2) washing and drying the alumina and contacting it with ammonium hydroxide, C. boiling the organic liquid obtained in step B.1) until the ethoxylated compound remains, D.1) acidifying the ammonium hydroxide solution obtained in step B.2) and isolating the denser organic phase from the lighter aqueous phase formed, D.2) steam distilling the organic phase after acidifying it and collecting the organic portion, D.3) steam distilling said organic portion in the presence of an acid and a non-volatile oxidizing agent and collecting the fluoroalkanoic acid distilled, D.4) neutralizing the fluoroalkanoic acid with ammonium hydroxide.

1 Claim, No Drawings

PROCESS FOR SEPARATING SURFACTANTS USED IN THE MANUFACTURE OF CONCENTRATED FLUOROPOLYMER DISPERSIONS

FIELD OF THE INVENTION

This invention concerns a process for the high yield recovery, in reusable form of surfactants of both the nonionic and anionic types from an aqueous dross liquor produced during the so-called "thermal concentration" of polytetrafluoroethylene (PTFE) polymer raw dispersion to increase polymer content.

BACKGROUND OF THE INVENTION

The surfactants present in the aqueous dross liquor (usually called "supernate") can come from two sources. One source is the anionic surfactant or dispersant used during the polymerization of tetrafluoroethylene. This surfactant is an ammonium perfluoroalkanoate (called AMPFAk hereafter). A preferred surfactant of this type is ammonium perfluorooctanoate (AMPFO hereafter).

The second source is the surfactant used in concentrating the raw dispersion obtained from the polymerization. This surfactant is a nonionic one and is a hydrocarbyl oxyethoxylate subclasses are aliphatic alcohol ethoxylates and alkyl phenol ethoxylates. A preferred surfactant of this type is "Triton" X-100. These surfactants are sometimes generically called hydrocarbyl oxyethoxylated polyethers. The raw dispersions are typically concentrated to 55–60 wt. % solids by a so-called "thermal concentration" process such as that described in U.S. Pat. No. 3,037,953. The raw dispersion, typically containing from 35 to 45 wt % solids, is charged to a jacketed vessel capable of being heated to temperatures below the boiling point of the dispersion. To the raw dispersion is added a nonionic surfactant of the hydrocarbyl oxyethoxylate type. Preferably, ammonium hydroxide is also added to render the dispersion alkaline (pH=9 to 11) to accelerate the thermal concentration process and to resist later bacterial "souring" of the concentrated dispersion product.

The contents of the vessel after mixing are then heated to a temperature somewhat above the cloud point of the surfactant, and allowed to stand (unagitated) at this temperature until separation into two liquid layers is essentially complete. The nearly clear supernatant layer (hereafter called "supernate") is then syphoned or decanted off, and the lower layer, consisting of a concentrated, colloidal dispersion of the polymer containing 55–60% solids by weight, is pumped to storage tanks from which it is withdrawn for subsequent packaging and commercial sale.

A preferred nonionic hydrocarbyl oxyethoxylated surfactant for use in the thermal concentration process is an alkyl phenol ethoxylate, namely, a t-octylphenol ethoxylate containing, on average, from 9 to 10 ethylene oxide units per molecule. Such a surfactant is commercially available as "Triton"X-100, sold by the Rohm & Haas Company. A suitable nonionic surfactant of the aliphatic alcohol ethoxylate type is "Tergitol" 15-S-9, sold by Union Carbide Corporation. This surfactant contains from 11 to 15 carbon atoms per molecule of aliphatic alcohol and, on average, 9 moles of ethylene oxide units per mole of alcohol.

The surfactants present in the supernate formed in the thermal concentration process are intrinsically valuable, but their recovery is difficult because their concentrations in the supernate are relatively low, especially for the more valuable surfactant, AMPFAk. Furthermore, the surfactants consist of molecules having more-or-less distinct polar and non-polar portions, so that they tend to "bridge" ordinarily immiscible media such as might otherwise be used for their separation, as, for example, by liquid-liquid extraction. In addition, both surfactants have pronounced, and generally undesirable, foaming tendencies, especially in aqueous media.

Despite these difficulties, recovery of the surfactants is desirable because the disposal of the supernate by acceptable means is difficult. Ethoxylates, represented by "Triton" X-100, though considered biodegradable, degrade only slowly, even by bacteria acclimated to feeding upon it, and AMPFO is not biodegradable, nor is PTFE. The foaming tendency of the supernate can also pose troublesome problems in its disposal.

A known method for recovering "Triton" X-100 from dilute aqueous solutions in the concentration range typical of that found in supernate is to take advantage of the "inverse" solubility--temperature relationship found in the "Triton"--water system. Thus, such solutions, homogeneous at room temperature, can simply be heated to temperatures between the cloud (ca. 70° C.) and normal boiling point (ca. 100° C.) to effect a separation into two liquid phases, one rich in "Triton" and the other poor in "Triton". However, the basic effect of AMPFAk on the "Triton"--$H_2O$ system is to promote compatibilization of these components; i.e., to increase their miscibility. Thus, the effect of the presence of AMPFAk is to increase both the solubility of water in the "Triton"-rich phase, and the solubility of "Triton" in the water-rich phase; the cloud point (the temperature at which miscibility becomes limited) is raised as a result. AMPFAk, at the concentration level at which it is normally present in supernate, prevents a phase separation from being obtained by simply heating the supernate to a temperature up to as much as about 10 to 20° C. above that used in the thermal concentration of PTFE dispersion (but below the normal boiling point of the supernate).

Another limitation of this "thermal" phase-separation method is that, in the case where AMPFO (or its corresponding acid, usually designated C-8 acid) is present, the fluorosurfactant does not become well separated from the nonionic surfactant, even if phase separation does occur. On the contrary, the usual tendency is for the majority of the fluorosurfactant present to remain in the phase which is richer in the nonionic surfactant.

Various other recovery procedures have been devised. The use of ion-exchange for the recovery of fluorinated surfactants from aqueous media has been disclosed in the patent literature, as, for example, in U.S. Pat. No. 3,882,153, and more recently in U.S. Pat. No. 4,282,162. However, the treatment of the above-described supernate by ion exchange, using the same resin ("Lewatit" MP-62, a weakly basic anion exchanger sold commercially by Bayer AG) predominantly employed in the Examples of U.S. Pat. No. 4,282,162, and following the absorption and elution procedures of that patent (using an aqueous HCl/n-propanol mixture for elution), did not produce satisfactory long-term results. The ion-exchange resin on repeated use rapidly lost its capacity for AMPFO, so that after five cycles of use it retained only a small fraction of its initial capacity. The cause of this drop-off could not be readily ascertained. In addition to this major deficiency in performance, the ion-exchange resin is relatively expensive unless it can be reused many times, and the overall procedure is cumbersome for practical application. With the nonionic surfactant present, extensive washing and rinsing of the resin is necessary for its removal. Furthermore, the presence of the dispersed PTFE in supernate is also a potential source of fouling of the ion-exchange resin, and the other anionic components (besides AMPFO) present may be capable of reducing its exchange capacity for AMPFO.

It is desirable to provide a process for recovery of the surfactants discussed above which employs common, inexpensive inorganic reagents and a simple organic solvent, thereby avoiding the complexity of such techniques as ion exchange for effecting the separation of the surfactants, which overcomes foaming by appropriate choices of media and conditions, especially of pH level, and which can be carried out at atmospheric pressure and at ambient temperature.

SUMMARY OF THE INVENTION

A process for separating the ammonium salt or alkali metal salt of a fluoroalkanoic acid having the general formula

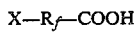

X—R$_f$—COOH wherein X is a member of the class consisting of hydrogen, fluorine or chlorine and R$_f$ is a saturated, perflorinated linear or methyl branched alkylene group containing 5 to 10 carbon atoms, from a hydrocarbyl oxyethoxylated polyether having the general formula:

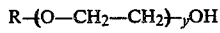

R—(O—CH$_2$—CH$_2$)$_y$OH where R is or a primary or secondary alkyl group of 11-18 carbon atoms or is

where R' is a primary, secondary or tertiary alkyl group containing 8 to 12 carbon atoms, and y is a cardinal number of from 8 to 14, where both are present in an aqueous mixture, which comprises:
A. extracting the salt (in the form of its corresponding acid) and the ethoxylated compound from an acidified aqueous mixture containing both by agitating the aqueous mixture with a chlorinated hydrocarbon, organic liquid selected and separating the organic liquid layer,
B.1) contacting said organic liquid layer with activated alumina and separating the organic liquid which contains the ethoxylated compound, and the alumina, which contains the acid,
B. 2) contacting the alumina with ammonium hydroxide to remove the acid from the alumina,
C. boiling the organic liquid obtained in step B.1) until the ethoxylated compound remains,
D.1) acidifying the ammonium hydroxide solution obtained in step B.2) and isolating the denser organic phase from the lighter aqueous phase formed,
D. 2) steam distilling the organic phase after acidifying it and collecting the organic portion,
D. 3) steam distilling said organic portion in the presence of an acid and a non-volatile oxidizing agent and collecting the fluoroalkanoic acid distilled,
D. 4) neutralizing the fluoroalkanoic acid with ammonium hydroxide.

DESCRIPTION OF THE INVENTION

The term PTFE as used herein means the homopolymer and copolymers where very minor amounts of comonomer units can be present.

A. Extraction Step (Step A):

In this step, both the ionic and nonionic surfactants are isolated from an aqueous dross liquor (this liquor will be referred to hereafter as "supernate") by extracting them from the aqueous supernate into a chlorinated hydrocarbon organic liquid; (any residual PTFE in the supernate precipitates and is collected).

Supernate obtained from the PTFE dispersion concentration method described in the BACKGROUND section is acidified to a low pH, e.g. below 7, preferably about 1–2, with an aqueous mineral acid (preferably sulfuric acid), and then agitated at room temperature for a short time in the presence of the chlorinated hydrocarbon preferably tri- or dichloromethane. The addition of the mineral acid converts the anionic surfactant (AMPFAk) from its ammonium salt to the corresponding carboxylic acid (perfluorooctanoic acid is representative and it is called "C-8" hereafter). Under these conditions, the PTFE present coagulates to form a non-dispersed solid phase, and the great bulk of both the nonionic and anionic surfactants is transferred into the organic phase. Separation of the two liquid phases is relatively sharp, and no foaming problem is encountered. Preferably, a second extraction is performed, conveniently using the same amount of organic liquid as before, on the aqueous layer after separation of the phases has been effected. The concentrations of both surfactants remaining in the aqueous phase after this second extraction are extremely low. After removal of dissolved, volatile organic liquid from the aqueous phase (where its concentration is only about 2 wt percent) by simple distillation (with the recovered organic liquid in the distillate being available for re-use in extraction) the aqueous layer, after neutralization with an appropriate reagent such as sodium hydroxide, lime, or limestone, can easily be disposed of. If desired, the organic liquid in the aqueous phase can also be recovered by "salting out" at room temperature, through saturation of this phase with sodium chloride or the like.

The coagulated PTFE, which tends to collect at the liquid-liquid interface after the first extraction, settles out almost completely in the organic phase after the second extraction. It can readily be removed from this phase by filtration, or simply by collection on a finemesh screen.

If the supernate is not acidified prior to extraction, emulsification tends to occur, and the foaming tendency remains high. Furthermore, the PTFE does not coagulate on extraction.

Trichloromethane can be used instead of dichloromethane as extracting agent, and is about equally effective. Both these extractants are essentially non-flammable. Although trichloromethane has some advantages over dichloromethane in having lower mutual solubility in and for water, and in being less volatile at room temperature, dichloromethane is preferred because it has a ten-fold higher Allowable Exposure Limit, as prescribed by the American Conference of Governmental and Industrial Hygienists.

It is well known that, by appropriate design of process vessels and exhaust ducts, vapors evolved by dichloromethane (or trichloromethane) during the operation of processes in which these compounds are used can be conducted to beds of activated carbon for trapping, and, if desired, subsequent recovery.

Surprisingly, it was found that use of dichloromethane to extract perfluorooctanoic acid (C-8) from the mixture obtained when sulfuric acid was added to a solution of AMPFO in water (i.e., with no "Triton" present) was not effective. When shaken, the contents of the separatory funnel in which the extraction was carried out became very foamy, filling the funnel completely, even though the total liquid volume initially charged (aqueous phase, plus 20% by volume $CH_2Cl_2$) was less than one quarter the empty volume of the funnel. Titration (with Standard NaOH solution) of the upper (aqueous) and lower (organic) layers obtained after a 20-minute standing period indicated that the C-8 acid had by no means been effectively removed from the aqueous phase.

Also surprisingly, the halocarbon liquid 1,1,2-trichloro-1,2,2-trifluoroethane (FREON ® 113) was not found suitable as an extractive agent for supernate, whether the latter was in either an alkaline or acidic condition. The major advantages of excellent separation with little or no foam formation provided by the dichloromethane and trichloromethane extractants were found lacking with the chlorofluorocarbon compound.

While AMPFO is essentially insoluble in an aromatic liquid such as toluene at ordinary temperatures, whereas "Triton" X-100 is miscible in all proportions with toluene, attempts to separate solutions of AMPFO in "Triton" X-100 by addition of toluene were found unavailing. The same was true when the AMPFO was present in the form of its corresponding acid, C-8, (through mineral acid addition), rather than the ammonium salt.

Advantages of this extraction method (over the "thermal" phase-separation method) of separating the nonionic ethoxylated surfactant and the AMPFAk from (acidified) supernate are as follows:

1. The concentration of residual ethoxylated surfactant in the aqueous phase is significantly lower when extraction (especially the preferred two-step extraction) is used. Furthermore, when AMPFAk is present, its effect in the "thermal" method is to increase this concentration of residual ethoxylated surfactant in the aqueous phase. While this solubilizing effect can be offset by addition of electrolytes such as sodium chloride, the aqueous effluent to be disposed of then contains an additional component.

2. The extraction method effects a coagulation of the PTFE solids dispersed in supernate, thereby facilitating their easy removal. With the "thermal" method, this PTFE remains dispersed.

3. The extraction method can conveniently be carried out at room temperature.

4. In the extraction method, nearly all of the AMPFAk is extracted into the organic solvent layer with the ethoxylated surfactant, and very little water is present in this phase. Evaporation of the low-boiling solvent (after adsorption of the acid form of the AMPFAk onto alumina) gives a highly concentrated ethoxylated surfactant residue. In the "thermal" method of separation, the ethoxylated surfactant-rich phase contains about 33 or more percent water, especially if AMPFAk is present or if the separation is carried out below the normal boiling point of about 100° C.

5. Presence of AMPFAk prevents use of the usual phase-separation procedure employed to isolate the ethoxylated surfactant from water.

B. Adsorption/Desorption Step (Using Alumina):

In this step the ionic surfactant is removed from the organic liquid by adsorption on alumina, leaving the nonionic surfactant in the organic liquid.

The organic extract from A above, which typically contains 10–20 wt. % of nonionic hydrocarbyl oxyethoxylated surfactant and about 0.4–0.8 wt. % of anionic perfluorinated alkanoic acid surfactant, represented by C-8, is contacted with activated alumina, preferably in granular form, at room temperature under conditions of mild agitation. A commercial grade of alumina containing particles in the 8–14 mesh range is representative. To insure activity, the alumina may be heated to about 220° C. for 2–4 hours in an air oven prior to use, and then protected from contact with moist air during and after cooling to room temperature.

The alumina serves to remove the perfluorinated alkanoic acid from the organic supernate extract liquid by adsorption. If the nonionic surfactant is to be re-used neat for the thermal concentration of raw PTFE dispersion (after recovery from the organic extract), it is necessary to reduce the concentration of residual alkanoic acid in it to about 0.5 wt. % or below; otherwise, the cloud point of the system is altered, and thermal concentration behavior and performance are adversely affected. With mild agitation under room temperature conditions in the adsorption step, it has been found possible to reduce the proportion of alkanoic acid to nonionic surfactant to the above level in a matter of a few hours when 80–120 grams of alumina are used per liter of extract. Longer contacting times provide a greater degree of adsorption of the anionic surfactant, as does more vigorous agitation; however, the latter alternative can lead to an undesirable degree of mechanical attrition of the adsorbent.

Alumina suitable for use in the adsorption/desorption step is of the type available commercially under the familiar designation "activated alumina". As a general rule, the smaller the particle size of the alumina granules (and the correspondingly greater (external) surface area per unit of weight), the more rapidly both adsorption and desorption tend to occur. On the other hand, small particle size tends to increase the loss of adsorbent through dissolution, mechanical losses, and the like. A size fraction of granules between 8- and 14-mesh screen size has been found to provide a good balance between these abovementioned effects, but is not essential for commercial utility or suitability.

The liquor in contact with the alumina is drained off when the contacting period is terminated, and the alumina washed with fresh dichloromethane or trichloromethane to remove residual nonionic surfactant as completely as possible. The washings can be added to the alumina-treated extract. A portion of the nonionic surfactant, typically equal to about half the weight of adsorbed anionic surfactant, appears to be tightly enough adsorbed on the alumina so as not to be readily removable by washing.

The dichloromethane or trichloromethane remaining on the alumina after draining of the washings can be vaporized off with air (or nitrogen) and passed through a standard activated carbon adsorber unit for trapping (and, if desired, later recovery) of the organic liquid.

To recover the alkanoic acid from the alumina, the dried alumina from the adsorption step is contacted with aqueous ammonia at room temperature, again with mild agitation. The ammonia converts the adsorbed alkanoic acid to its ammonium salt (AMPFAk), which then desorbs from the alumina. Residual nonionic surfactant also is removed from the alumina by this treatment. By using an appropriate concentration of $NH_4OH$ (typically, about 1.5N), it is possible to effect nearly complete desorption in a matter of a few hours, using 3-5 liters of $NH_4OH$ per kilogram of solid. Use of higher concentrations or of somewhat elevated temperatures will accelerate the desorption, but is apt to cause an undesirable degree of attrition of the alumina granules. Mild agitation, is preferred, not only to minimize such attrition, but also to avoid an undesirable degree of foam formation.

After the aqueous liquor has been drained from the alumina at the end of the contacting period, the alumina can be washed under mild agitation for a short period with fresh 1.5N $NH_4OH$ and then with demineralized water, with these washings being added to the main desorption liquor. The alumina can then be regenerated for adsorptive use by the same air-oven treatment described earlier. Tests have shown that the recovered alumina retains its effectiveness as adsorbent after five or more repeat cycles of such use. The overall consumption per cycle (based on use of fresh alumina) is of the order of 15 percent.

If the desorption liquor is allowed to stand at room temperature for an extended period of time without neutralization, a white solid gradually settles out. Analysis shows this precipitate to be hydrated aluminum oxide. While it can be filtered off without difficulty, it is desirable instead to prevent its formation by acidification of the desorption liquor shortly after desorption is completed.

C. Solvent Evaporation Step:

The organic liquid remaining after the adsorption step can simply be boiled at atmospheric pressure to evaporate off the residual dichloromethane solvent or trichloromethane, thereby leaving the neat hydrocarbyl oxyethoxylated surfactant (containing 0.5 wt % less of alkanoic acid) available for re-use in the thermal concentration of PTFE dispersion. The evaporated $CH_2Cl_2$ or $CHCl_3$ is condensed for re-use in the extraction step. In large-scale operation, the yield of recovered nonionic surfactant approaches 98 percent.

In case the organic liquid remaining after the adsorption step is not water-white, it has been found possible to remove the color effectively by conventional treatment at room temperature with low levels of activated carbon adsorbents, such as charcoal of the commercially available "Darco" brand. The carbon is filtered off after a short mixing and contacting period, leaving the liquid essentially water-white. The loss of nonionic surfactant in this additional treatment step is very small.

D.1) Acidification/Centrifugation Step:

The concentration of valuable alkanoic acid in the desorption liquor obtained in step B is low, typically of the order of 1 wt %, with about half this level of nonionic surfactant also present. To achieve a high level of recovery in a much more concentrated form, it has been found that addition of a mineral acid to the alkaline desorption liquor (and washings) until the pH level is 1 or below (i.e., below the pKa of the acid form of the fluorosurfactant, which is of the order of 1.5) causes the acid (along with most of the nonionic surfactant) to separate out as a semi-solid phase, with only a very low concentration of either surfactant left in the bulk aqueous liquor. For reasons which will become apparent hereinafter, use of a non-volatile acid, such as sulfuric acid, is preferred. To provide sharper separation and to minimize the amount of the separate, low-surface-tension organic phase clinging to vessel surfaces, it is desirable to subject the mixture to mild centrifugation after addition of the mineral acid. The bulk of the less dense aqueous phase can then readily be decanted or syphoned off, leaving a nearly water-free organic phase (containing a low concentration of mineral acid) for further purification treatment. The volume of this phase now typically represents less than one two-hundredth that of the volume of supernate originally taken for treatment. This phase is found to be medium-to-dark brown in appearance, possibly because of the presence of colored matter formed by degradation of non-ionic ethoxylated surfactant during thermal concentration.

The decanted aqueous phase, after neutralization with an appropriate base, is readily disposed of with very little loss of either anionic or nonionic surfactant incurred thereby.

D.2) and D.3) Distillation Step

The organic layer recovered from the acidification/centrifugation step is next subjected to steam distillation at atmospheric pressure in the presence of a non-volatile mineral acid, preferably sulfuric acid. This is a heterogeneous distillation, with the alkanoic acid form of the anionic surfactant being nearly insoluble in the aqueous mineral acid. By controlling the ratio of mineral acid to water in the still pot by appropriate addition of water as the distillation proceeds, it is possible to control the still-pot temperature and thus the composition of the distillate. In this system, the chief volatile components are water and the alkanoic acid form of the anionic surfactant. The nonionic surfactant (or its degradation products after contact with the mineral acid under distillation conditions) has relatively low (but finite) volatility, while the mineral acid is essentially non-volatile if, for example, sulfuric or phosphoric acid is used.

At low ratios of mineral acid to water, the normal boiling point of the mixture is not much over 100° C, and the ratio of alkanoic acid to water in the distillate is unattractively low. However, as the ratio of mineral acid to water increases, the normal boiling point increases rapidly. At a weight ratio of 1:1, the normal boiling point reaches about 125° C., raising the vapor pressure of the (separate) fluoroalkanoic acid phase in the still pot to the point where the concentration of alkanoic acid in the distillate reaches 10-15% by weight. The distillate at this concentration is a gelatinous fluid which is reasonably mobile at room temperature. By admitting water to the still pot at a rate corresponding to its rate of removal in the distillate, it is possible to maintain nearly constant boiling temperature in the still pot (and roughly constant distillate composition) until essentially all of the alkanoic acid has distilled over. The ratio of the aqueous acid phase to the alkanoic acid phase in the still pot is, in principle, immaterial in a heterogeneous distillation of this sort, though the lower this ratio, the more critical is the control of the rate of water addition during distillation. The use of a low ratio, however, is desirable from the standpoint of minimizing the amount of residue to be disposed of when distillation is complete. In any event, the amount to be disposed of is small relative to the amount of supernate originally taken for treatment.

Surprisingly, in the presence of the mineral acid no significant foaming problem is encountered throughout the course of the distillation.

Since the ethoxylated surfactant is functionally a primary alcohol and the alkanoic acid is considered a strong acid, the possibility exists of ester formation by their mutual reaction. However, no indication of an ester grouping was detected when either dichloromethane or trichloromethane extracts of the cooled still pot residue following the first distillation in the presence of sulfuric acid were examined in the infrared region.

The distillate from this first distillation normally contains some nonionic surfactant or degradation products therefrom, and is therefore not of a purity such that the fluoroalkanoic acid it contains could be directly re-used as dispersing agent in the polymerization of tetrafluoroethylene, since most compounds containing C-H bonds have long been recognized to have adverse effects on the dispersion polymerization of TFE because of inhibition and/or chain-transfer. Typically, the weight ratio of non-ionic surfactant (and its degradation products) to anionic fluorosurfactant, after the distillate from the first distillation has been acidified with mineral acid to concentrate nearly all of the fluorosurfactant in a separable phase, is perhaps of the order of 1:20 (vs a value of 1:2 in the feed to the first distillation). To purify the fluorosurfactant (AMPFO), a second distillation, similar to the first, is therefore desirable, with the modification that, in the second distillation, a non-volatile oxidizing agent is also included in the still pot. Preferably, the mixture is refluxed for a short period of up to 1 hour before distillation is commenced. The oxidizing agent effectively serves to destroy the nonionic surfactant or convert it to compounds which do not contaminate the distillate, as demonstrated by the fact that the fluorosurfactant obtained from the distillate (after neutralization with NH$_4$OH to give its ammonium salt) can be used successfully as dispersing agent for the polymerization of tetrafluoroethylene. For this refluxing, it is preferable to adjust the acid concentration slightly upward, so that the boiling temperature is raised somewhat above that at which the subsequent distillation will proceed. Addition of water to the still pot after the refluxing period will provide a lower boiling temperature.

The preferred oxidizing agent in the second distillation is potassium (or sodium) dichromate. Substances containing peroxy-linkages (such as persulfates or hydrogen peroxide) tend to decompose too readily under distillation conditions in the presence of the mineral acid to be effective. The amount of dichromate salt used should be sufficient to provide a reserve of at least 10% of the initial amount after the distillation is complete. Qualitatively, the presence of residual dichromate can be detected visually by observing the color of the mixture in the still pot.

The reason for not incorporating the oxidizing agent in the first distillation is that the relatively high level of nonionic surfactant remaining at that point would result in an undesirably high consumption of the oxidizing agent, thereby increasing its cost and also increasing waste disposal burdens.

Again in this second distillation, no problem with foaming is encountered, either in the boiling mixture or in the distillate.

The still pot residues from both distillations cannot be disposed of as simply as the aqueous effluents from the extraction and acidification/centrifugation steps described earlier. However, the volumes of these pot residues, even when combined, are relatively small in comparison with the volume of supernate taken for treatment, and they can be accommodated in modern industrial waste treatment facilities.

The level of acid concentration which is most suitable to use (in either distillation) is influenced by several considerations. If the acid concentration is too low, the boiling temperature is reduced and the alkanoic acid acid concentration in the distillate is low, so a correspondingly larger amount of distillate must be collected to achieve the same degree of fluorosurfactant recovery. If the acid concentration is too high, the boiling temperature is raised to a level where the vapor pressure of the nonionic surfactant (and its degradation products) is sufficiently enhanced to cause increased contamination of the distillate. Furthermore, the extent of degradation of the nonionic surfactant will generally be increased by higher acid concentrations and the correspondingly higher boiling temperatures.

In principle, another mineral acid which may be used instead of sulfuric acid is phosphoric acid. The latter has the disadvantage, however, that much higher acid concentrations are required to achieve a given level of boiling temperature, and hence of alkanoic acid concentration in the distillate. Furthermore, phosphoric acid is more costly per unit of weight than is sulfuric acid.

For commercial use, suitable materials of construction for the equipment employed for both the first and second distillations are glass, glass- or enamel-lined metal, or tantalum- or zirconium-clad metal, with the metal cladding being preferred because of better heat-transfer properties and of freedom from mechanical or thermal shock.

D.4) Neutralization Step:

The final step of the recovery process is the neutralization of the alkanoic acid in the distillate from the second distillation. For this purpose, ammonium hydroxide, added at room temperature, can be used. Since the equivalent weight of perfluorooctanoic acid is 414, whereas that of ammonia is only 17, very little dilution of the distillate need be incurred in achieving neutralization. A homogeneous, water-white, aqueous solution containing 10–15 wt % of purified AMPFO can readily be produced in this manner. Typically, about a 100-fold dilution of this solution with demineralized water (on a weight basis) will provide a suitable aqueous charge for the dispersion polymerization of tetrafluoroethylene.

In calculating the recovery yield of alkanoic acid, it is important to recognize that the amount of it retained with the nonionic surfactant recovered for re-use does not represent a true yield loss. In fact, experience has indicated that the performance of stabilized, concentrated PTFE dispersions in coating and casting operations is improved if the concentration of anionic alkanoic acid in them is raised above the level simply needed for their successful manufacture by polymerization and thermal concentration. For this reason, direct post-addition of such fluorosurfactants after the thermal concentration step is by no means uncommon.

Including this portion of the fluorosurfactant retained with the recovered nonionic surfactant, the overall in-hand yield of recovered, purified anionic fluorosurfactant is found to approach 90 percent in tests carried out on relatively small scale in laboratory glassware, with reasonable prospects for even higher values when operating at larger scale.

ANALYTICAL METHODS

Analytical methods used in the Example consisted of the following:

For AMPFO, a modification of the colorimetric extractive procedure for analysis of anionic surfactants, as described in the "Encyclopedia of Industrial Chemical Analysis", Vol. 1, pp. 339–40, Interscience Publishers, New York, N.Y. (1971), was used. The method involves the use of a cationic blue dye (such as methylene blue or Azure A) to form an extractable blue complex which has an absorbance peak in the visible region at about 635 nm. Appropriate sample dilutions were used to obtain peak absorbance values in the range between 0 and 1, and "blank" corrections were applied. At low to moderate ratios of "Triton" X-100 to AMPFO, the "Triton" X-100 nonionic surfactant gives little or no interference. To analyze samples in which higher ratios were present, the sample was first steam distilled at atmospheric pressure in the presence of dilute aqueous phosphoric acid. The acid converts the AMPFO to its corresponding acid, C-8, which steam distills away from the "Triton" X-100 and can be measured in the distillate by the colorimetric procedure. Traces of "Triton" X-100 in the distillate do not interfere. Distillation was continued until the level of AMPFO coming over was insignificant.

For "Triton" X-100 in aqueous solution, analyses were performed by measurement of peak absorbance in the ultraviolet region at a wavelength of about 275 nm. Appropriate dilutions were used to bring the peak absorbance values into the 0-1 range, using a 1-cm path length.

Samples which contained dichloromethane were purged of this solvent by evaporation into a stream of nitrogen gas prior to analysis or to steam distillation.

Acid-base titrations were made using either phenolphthalein or screened methyl orange as indicators, or by potentiometric (pH) measurement when appropriate.

EXAMPLE

In the Example which follows, all proportions are expressed on a weight basis, unless otherwise specified. Concentrations of the AMPFO fluorosurfactant are expressed in terms of equivalent AMPFO, whether this compound is present in any given stage of the overall recovery process as the ammonium salt or as the corresponding acid (1 g AMPFO=414/431=0.961 g $C_7F_{15}COOH$)

A. Extraction Step:

Into a Squibb-type, glass separatory funnel having a nominal capacity of 3000 ml (actual capacity of 4300 ml) was placed, at room temperature, 2000 ml (2.006 kg) of supernate which had been decanted after commercial-scale thermal concentration of raw PTFE dispersion. The supernate contained 5.92 wt. % "Triton" X-100 and 0.212 wt. % of AMPFO, and sufficient ammonium hydroxide to give a pH between 9 and 10. 18 ml (25 g) of 50 wt. % aqueous $H_2SO_4$ was added, followed by 400 ml (529 g) of reagent-grade dichloromethane. The mixture in the funnel was shaken vigorously by hand for about one minute. The amount of foaming which occurred on shaking was negligible. After about a one-half hour settling period, the lower (organic) layer (440 ml; ca. 560 g) was withdrawn, followed by a small interfacial layer consisting of a slurry (16 ml) of coagulated PTFE polymer in the organic phase. The upper (aqueous) layer (ca. 1988 ml) was found to contain only 0.0076 wt % (76 ppm) of "Triton" X-100 and only 0.0022 wt. % (22 ppm) of (equivalent) AMPFO. The (equivalent) AMPFO content of the organic layer was found to be a 0.75 wt. %.

The aqueous residue was then extracted in a similar manner with a second 400 ml portion of dichloromethane at room temperature. The lower layer withdrawn after the extraction (372 ml; 490 g) had an (equivalent) AMPFO content of 0.060 wt. %. The upper layer had a volume of about 1986 ml and contained only 8 ppm and only 20 ppm of "Triton" X-100 and (equivalent) AMPFO, respectively. By distillation and condensation, the dichloromethane content of this layer was found to be about 1.6 wt. %. The acid content of this layer was found by titration with sodium hydroxide to a phenolphthalein endpoint to be about 0.06 g-equivalents per liter.

The low concentrations of "Triton" X-100 and APFO in the aqueous layer after either extraction show that both of these components can be removed to the extent of 99% or more from supernate by extraction.

In subsequent experiments on the same scale the interfacial layer was not withdrawn after the first extraction. Instead, by waiting until the second extraction was complete, virtually all of the coagulated PTFE settled to the bottom of the lower layer, and was thus readily withdrawn first from the separatory funnel. In addition, subsequent experiments on the same scale, in which fresh portions of supernate were successively extracted with fresh portions of dichloromethane without cleaning the funnel between extractions, showed that the fraction of the total extracted "Triton" X-100 and C-8 acid lost as a residue held on the walls of the funnel became significantly less than in a single double-extraction test. (This residue could, of course, also be removed by rinsing of the funnel with fresh dichloromethane after extraction, at the expense of (slight) dilution of the extracts.)

The coagulated PTFE recovered from the extraction step was easily removed from its slurry in dichloromethane by straining through a fine metal screen. While the level of dispersed PTFE in supernate tends to be variable depending on thermal concentration performance, it typically amounts to only 0.1 to 0.5 wt %.

Very similar results were obtained in smaller-scale tests in which trichloromethane was used instead of dichloromethane as extractant.

B. Adsorption/Desorption Step:

To a 500 ml (647 g) aliquot of the combined first and second dichloromethane extracts described above contained in a stoppered glass flask at room temperature was added 20.0 g of activated alumina. The alumina, sold commercially by Matheson, Coleman and Bell Incorporated as chromatographic grade, 80–200 mesh, Order No. AX0612, had been screened on a 140-mesh screen to remove fines, and then heated in an air oven for 4 hours at 260° C. about two weeks prior to use. (The alumina was protected from contact with atmospheric moisture during this two week period.) The slurry of alumina in the extract was occasionally shaken vigorously over a period of about three hours, and then allowed to stand for a period of about 64 hours at room temperature. The liquid (ca. 480 ml) was then carefully decanted from the solid, and contacted in a similar manner to that above (except for reduction of the standing period to about 24 hours) with a second 20.0-g portion of fresh alumina of the same type as before. At the end of the standing period, the liquid was again carefully decanted from the solid. The measured concentrations of (equivalent) AMPFO in the first and second liquids recovered after adsorption were 0.054 wt. % and 0.007 wt %, respectively. The calculated levels of (equivalent) AMPFO captured on the adsorbent were 0.115 and 0.017 g/g, respectively.

The amount of "Triton" X-100 remaining in the 500 ml aliquot of the combined dichloromethane extracts was calculated to be about 73 g, or 11.3 wt %. Hence the concentration of (equivalent) AMPFO, based on "Triton" X-100 (i.e., on a dichloromethane-free basis), remaining in the liquid after the first adsorption with alumina was 0.054/0.113=0.48 wt %. "Triton" X-100 containing even somewhat over 0.5 wt % AMPFO can be re-used successfully for the thermal concentration of PTFE dispersion under normal conditions.

It was found that washing of the recovered alumina with relatively small quantities of fresh dichloromethane would reduce this ratio of "Triton" X-100 to AMPFO on the alumina to ½ to 1, without significantly removing any of the adsorbed fluorosurfactant. At the ½ to 1 ratio, both surfactants are apparently present on the alumina in an adsorbed condition.

The alumina used for the above adsorption tests was considered to be too finely divided to be well suited to commercial-scale use. Accordingly, a group of four other types of larger particle size (up to about ⅛-inch) was evaluated. While most of these showed approximately comparable saturation adsorptive capacity for the alkanoic acid fluorosurfactant (about 0.2 g/g) after prolonged contact, the most suitable candidate from an overall standpoint of capacity, rapidity of adsorption, and particle size appropriate for large-scale operation was an 8-14 mesh screen fraction of activated alumina sold commercially by Matheson, Coleman and Bell, Incorporated under the designation of Order No. AX06010. With this candidate (after activation by heating in an air oven for 10 hours at 220° C.), it was found that 85% or more of the (equivalent) AMPFO typically present in the dichloromethane extract of supernate could be adsorbed, in a single contacting under conditions of mild agitation at room temperature and at an adsorbent loading of 100 g per liter of extract, in a period of about 4 hours. This degree of reduction in the level of residual APFO in the dichloromethane extract brought the weight ratio of AMPFO to "Triton" X-100 low enough (i.e., about 1 to 200) for the "Triton", after evaporation of the dichloromethane solvent, to be directly reusable for the thermal concentration of PTFE dispersion.

For the desorption of C-8 acid adsorbed on alumina (MC&B, Type AX0610), ammonium hydroxide solution was used. It was found that nearly complete removal of the fluorosurfactant, in the form of an alkaline solution of its ammonium salt, could be conveniently achieved at room temperature, under conditions of mild agitation, in a period of two hours or less when 1.5N aqueous NH4OH was used, at a level of 0.4 liter of liquid per 100 g of solid. The same degree of desorption could be achieved more rapidly by use of higher temperature, higher solution concentration, or more vigorous agitation, but at the expense of increased attrition of the alumina particles. A preferred desorption procedure is: To a spherical glass 1-liter "Morton"-type flask, having four deep "creases" in its walls and mounted such that it could be rotated about its central axis at an angle of about 30° to the horizontal, was charged 100 g of alumina which had been used to adsorb perfluorooctanoic acid (C-8) from a dichloromethane (single-fold) extract of supernate. The alumina, which had been separated from the extract, then washed with fresh dichloromethane, and dried by evaporation of residual solvent into a stream of nitrogen at room temperature, contained about 7 g of (equivalent) APFO and about 3.5 g of "Triton" X-100 adsorbed on its surface. A 400-ml quantity of 1.5N NH4OH solution was then added, and the flask was rotated at about 20 to 30 RPM for a period of 1 hour. While some foam was produced during this period as desorption occurred, it neither filled the freeboard of the flask, nor posed any handling problems. The liquid was then decanted and drained from the solid, and a 150-ml portion of fresh 1.5N NH4OH solution was added to the wet solid in the flask. Rotation at the same rate as before was begun, and continued for 10 minutes. The liquid was decanted and drained as before. A 125-ml quantity of demineralized water was then added to the wet solid in the flask, which was then rotated at the same speed as before for another five minutes. A second demineralized water wash was then carried out under the same conditions as the first.

The water-wet alumina remaining after desorption was set out to dry at room temperature, and later reactivated by heating for 10 hours at 220° C. in an air oven. The overall weight loss of the alumina across this (first) adsorption/desorption cycle was about 15 percent. Subsequent experience has shown that the alumina still remains active after 5 or more such cycles.

C. Solvent Evaporation Step:

To a conventional laboratory glass distillation assembly, consisting of a 500-ml round-bottom, long-necked flask, a distilling head provided with a sidearm and a thermometer, a straight-tube condenser having a 25-cm long jacket for cooling water, a take-off adapter and graduated cylinder receiver, was charged 248.6 g (ca. 192 ml) of the dichloromethane extract of supernate which had been twice contacted with activated alumina, as previously described. An atmospheric pressure steam bath was used to supply heat for the distillation. Alumina granules were added to the distilling flask to promote smooth boiling.

Distillation was continued until after the contents of the flask had ceased to boil. No foaming problem was encountered. A total of 215.6 (164.5 ml) of distillate was collected, which appeared to be nearly pure dichloromethane plus a small amount of water. The residue in the flask (primarily "Triton" X-100) weighed 30.4 g, and had some odor of residual dichloromethane. After blowing a slow stream of dry nitrogen into the flask for 30 minutes, the weight of the residue, which was now virtually free of this odor, was 29.4 g. The residue gave a neutral reading with pH paper. The calculated overall in-hand yield of recovered "Triton" X-100 was about 90%. The recovered "Triton" gave equivalent performance to fresh "Triton" in the thermal concentration of PTFE dispersion.

In some cases, the recovered "Triton" was found to have a very light brown color, distinguishable from fresh "Triton", which is nearly water-white. The possible source of this brownish tint has been alluded to previously. It was found that a color can be virtually all removed by treating the dichloromethane extract, after alumina treatment, with activated carbon (a charcoal, of 20- to 40- mesh size) such as "Darco" for one hour at room temperature with mild agitation, using a loading of 13 g of carbon per kg of extract. The spent carbon is then filtered off for washing and disposal, and the remaining extract (and washings) distilled to recover both "Triton" and dichloromethane, as described earlier.

D.1) Acidification/Centrifugation Step:

The four decants obtained in step B were combined to give an ammoniacal solution containing about 1 wt % of AMPFO and about 0.5 wt % of "Triton" X-100. In order to reduce markedly the amount of water associated with the AMFPO fluorosurfactant, the solution, after filtration to remove fine particles of alumina, was treated with one-tenth its volume of 50 wt % aqueous sulfuric acid solution. The addition of the acid caused the separation of a denser phase consisting primarily of C-8 acid and "Triton", with relatively low concentrations of either surfactant remaining in the less-dense, predominantly aqueous, phase. The denser phase did not settle out rapidly, however, and had a tendency to coat the walls of the glass containing vessel right up to the liquid-air interface. The mixture, contained in flat-bottom, cylindrical glass jars, was therefore centrifuged at 1500 RPM (about 475 times gravity) in a floor-model laboratory centrifuge for 20 minutes. Excellent phase separation was achieved, and the organic phase previously coating the walls was brought to a relatively small pool at the bottom of the vessel. Most of the upper layer was carefully decanted off, leaving only a small volume over the lower layer. The concentrations of (equivalent) AMPFO and "Triton" in the upper layer were measured to be only 0.0029 and 0.016 wt %, respectively, corresponding to losses of only about 0.33 and 3.5% of the total amounts present before acidification, and permitting ready disposal (after neutralization with a base, such as sodium hydroxide, followed by dilution) of this waste.

The lower phase, consisting primarily of C-8 acid and about half its weight of "Triton" X-100, was medium-to-dark brown in color. As speculated previously, this color may derive from degradation of "Triton" X-100, possibly back in the thermal concentration step.

D.2) and D.3) Distillation Steps:

A laboratory glass distillation apparatus was assembled consisting of a 500-ml, round-bottom, three-necked flask with ground-glass straight-taper joints. To the center neck was attached a distilling head, provided with thermometer and side arm and having similar joints. Into one of the inclined side necks of the flask was fitted, through a ground-glass joint, a thermometer which extended close to the bottom of the flask. To the other side neck was attached a graduated dropping funnel of 125-ml capacity, used for periodic addition of demineralized water in measured amounts to the flask.

The side arm of the distilling head pointed downward at an angle of about 20° to the horizontal, and connected via a ground-glass straight-taper joint to a water-cooled, straight-tube condenser having a jacket length of 11 cm. The condenser discharged via two simple adapter pieces having ground-glass, straight-taper joints into a flask identical to the distilling flask but open to the atmosphere through the side necks. The distilling flask was heated by means of an electric mantle having a power rating of 270 watts at 115 volts AC, and was supplied from a 0–135 volt adjustable autotransformer. All ground-glass joints of the apparatus were lightly lubricated with KRYTOX ®, a chemically inert, fluorinated grease.

To the distilling flask was charged a 30.4 g portion of a 70.0 g quantity of combined lower layers (which 70 g included 7.0 g of unseparated upper layer) obtained by centrifugation, as described previously. In this case, portions of supernate had been subjected to single extractions with dichloromethane, and the extracts to single adsorptions with activated alumina (using 100 g of alumina per liter of extract). To the flask was then added 275 ml (383 g) of 50 wt % aqueous sulfuric acid solution, followed by a few alumina granules to promote smooth boiling. To the dropping funnel was charged 50 ml of demineralized water. The distilling flask was blanketed with glass cloth to minimize heat loss.

Distillation was commenced, and the first drop of distillate appeared in the receiver when the pot temperature reached 122° C. (overhead temperature, 100° C.). The distillation was allowed to proceed until the pot temperature had reached 130° C., at which point 20 ml of water was slowly bled in from the dropping funnel. The pot temperature dropped to 126° C. after the water had been added. Distillation was continued in this way, with periodic additions of water to maintain the pot temperature within the range of about 125° to 130° C. (overhead temperature remaining at 100° C. throughout), until a total of about 130 ml of distillate had been collected. By this point, the distillate coming over had become noticeably less gelatinous, indicating a declining C-8 acid content. The power to the heating mantle was then shut off until the temperature of the contents of the distilling flask had dropped to below 85° C. The remaining 39.6 g of the same original feedstock, together with 40 ml of 50 wt % aqueous sulfuric acid, was then added to the distilling flask and the distillation was recommenced in the same manner as before. The distillation was continued into the same, unemptied receiver until an overall total of 350 ml of distillate had been obtained; i.e., until 5 ml of distillate had been collected per gram of (total) charge (exclusive of the aqueous sulfuric acid used). (Since this is a heterogeneous distillation (i.e., the C-8 acid is essentially insoluble in the aqueous mineral acid) the result is expected to have been substantially the same had the entire 70.0 g of charge been added initially to the distilling flask, rather than in two separate portions.) Throughout the distillation, there was no excessive foaming in the distillation flask, and no direct carry-over of liquid or foam from the flask to the condenser and receiver. The distillate, which was gelatinous and colorless throughout most of the distillations, was strongly acidic to pH paper. It had a noticeable odor, not characteristic of C-8 acid, which was believed attributable to degradation products of "Triton" X-100. The residue in the distillation flask was dark brown in color.

To the distillate was added a 17.5-ml (24.4 g) quantity of 50 wt % aqueous sulfuric acid solution. This caused the immediate precipitation of nearly all of the C-8 acid present. After a settling period, most of the upper layer (about 315 ml removed) was carefully decanted off, removing none of the lower layer with it. Analysis showed it to contain only a trivial amount of (well under 0.1 g) of (equivalent) AMPFO. Its content of "Triton" X-100 (or "Triton"-like material) was estimated by analysis in the ultraviolet region near 275 nm to be only about 0.06 g. To the lower layer plus the small residual quantity of upper layer was then added 245 ml (367 g) of 60 wt % aqueous sulfuric acid solution, and 12.00 g of reagent-grade potassium dichromate crystals. This mixture was then refluxed for one hour at atmospheric pressure (pot temperature ca. 135° C.), using a vertical, water-cooled condenser to provide complete condensation of the refluxing vapors. After the contents of the flask had cooled to room temperature, it was found that the C-8 acid present had crystallized out as a solid mass at the bottom of the flask, leaving an insignificant quantity in the overlying liquid layer. This upper layer was decanted cleanly for neutralization and disposal. Analysis of this liquid showed that 25% of the dichromate originally added remained undecomposed.

The residue in the distilling flask was then (re)distilled in the presence of 50 wt % aqueous sulfuric acid (224 ml), using the same arrangement employed in the earlier distillation. Again, water was added periodically to the flask to maintain the pot temperature between about 125° and 130° C. A small foreshots fraction of material distilling below 100° C. (presumably a degradation product of a "Triton" X-100) was collected separately and discarded. After 195 g (c. 180 ml) of (additional) distillate had been collected, it was clear that essentially all of the C-8 acid had been distilled. Again, no problem with foaming or carry-over was encountered leaving the entire course of the distillation.

The distillate, though clearly more pure than that from the first distillation, did have a slight, but similar, odor. However, spectrophotometric analysis in the ultraviolet in the region around 275 nm did not indicate the presence of any benzenoid structure.

The amount of (equivalent) AMPFO in the distillate was assayed to be 31.9 g, present at a concentration of 16.4 wt %. The in-hand yield of purified AMPFO, referred back to the supernate from which it was derived, was calculated to be 80%.

It was found that additional C-8 acid could be obtained by continued distillation of the pot residue from the first distillation. Thus, by continuing the periodic addition of water as before to maintain the pot temperature within a narrow range, essentially all of the C-8 acid present had distilled over after 255 ml (259.6 g) of (additional) distillate had been collected. Strong aqueous sulfuric acid was then added to this distillate to precipitate the C-8 acid, and the bulk of the upper layer was decanted, as described previously. In this case, the procedure previously described was altered somewhat for the continued work-up of the fluorosurfactant. Thus, instead of replacing the liquor in the distilling flask after the distillate had been refluxed in acid solution with 10 g of potassium dichromate for 1 hour, the liquid was simply left in the flask for the subsequent distillation, rather than being replaced with fresh aqueous sulfuric acid. The proportion of dichromate consumed during refluxing, 39%, did not increase during the subsequent distillation, and there was no sign of dichromate in the final distillate, showing that replacement of the liquor after the refluxing step (as described earlier) is not necessary. It was possible in this way (once again adding water periodically to the flask) to recover an additional 3.8 g of (equivalent) AMPFO by distilling over 60 ml more of liquid. With this additional recovered fluorosurfactant, the overall in-hand yield of AMPFO from the supernate from which it was derived was 90%. This high level of recovery is felt to be remarkably good, considering the fact that the concentration of AMPFO in the original supernate is only about one part in 450 by weight. In commercial practice the choice of how long the first distillation should be continued (in terms of amount of distillate collected relative to the amount initially charged to the still pot) depends largely on balancing the cost of continuing the distillation against the value of the declining incremental amount of fluorosurfactant recovered.

D.4) Neutralization Step:

To the distillate obtained from the second distillation was slowly added, starting at room temperature, 4 ml (3.6 g) of concentrated aqueous ammonium hydroxide (15N; 28 wt % $NH_3$). A moderate temperature rise was noted. For larger-scale operation, somewhat more dilute $NH_4OH$ is preferred. Slow addition of 1.5N aqueous ammonium hydroxide was then made until the pH of the solution reached 5.6, the same value as that measured for an aqueous solution of commercially available ammonium perfluorooctanoate of the same concentration. The quantity of 1.5N $NH_4OH$ required was 11 ml (10.9 g). The solution was water-white, and showed the strong foaming tendency typical of aqueous AMPFO solutions of about 15 wt % concentration.

E. Re-Use of AMPFO:

On the basis of analyses showing that approximately half of the AMPFO typically present in the raw PTFE dispersion fed to the thermal concentration process remains in the supernate (with the other half remaining in the concentrated dispersion), the recovered AMPFO solution was mixed 50/50 with fresh APFO solution of the same concentration, and used as (sole) dispersing agent for the polymerization of TFE homopolymer, using the normal recipe and conditions routinely employed to prepare dispersion intended for thermal concentration.

In the routine carrying out of TFE homopolymer dispersion polymerization by a standard procedure under nominally constant conditions, including maintenance of constant agitator speed, it is customary to experience some variation in space-time yield (expressed as the weight of polymer produced per unit time per unit volume of aqueous charge to the polymerizer) from run to run, when operating to nominally constant final solid content of the dispersion produced. For the recipe and conditions used in the runs in which the recovered AMPFO was tested against controls in which entirely fresh AMPFO was employed, past experience has indicated that a space-time yield (to nominal 35 percent solids content) of 360 g/liter-hour or above should be achieved for processing performance to be considered normal.

Two test runs with the recovered AMPFO solution (mixed 50/50 with fresh AMPFO, as described above) were interspersed between three control runs made with entirely fresh AMPFO solution of the same concentration. The test runs showed space-time yields of 382 and 369 g/liter-hour (average, 375), while those of the control runs were 442, 395, and 407 g/liter-hour (average, 416). Thus, while the space-time yields for the test runs averaged about 10% less than those of the control runs, the values for all runs were above the lower limit for acceptability. No statistically significant differences were found in the average sizes of the dispersion particles (whether measured by turbidimetric or dynamic laser light-scattering methods), nor in the so-called Standard Specific Gravity (SSG) values (an inverse measure of average molecular weight) of the test and control polymers. The SSG values were measured according to the procedure described in U.S. Pat. No. 3,142,665, except for revision of sample size, as specified in U.S. Pat. No. 3,819,594.

Furthermore, after the raw dispersions of the test and control runs had been coagulated to "fine powder" form and dried, it was found that the lubricated (paste)

extrusion performance (at 400/1 reduction ratio) of the two groups of resins was not significantly different statistically in terms of steady-state extrusion pressure at fixed lubircant content. Thus, the recovered fluorosurfactant could be successfully used in the synthesis of polymer intended for use in either dispersion or fine powder applications.

I claim:

1. A process for separating the ammonium or alkali metal salt of a fluoroalkanoic acid having the general formula $$X-R_f-COOH$$

wherein X is a member of the class consisting of hydrogen fluorine or chlorine and $R_f$ is a saturated, perfluorinated linear or methyl branched alkylene group containing 5 to 10 carbon atoms, from a hydrocarbyl oxyethoxylated polyether having the general formula $$R+O-CH_2-CH_2+_yOH$$

where R is a primary or secondary alkyl group of 11–18 carbon atoms or is

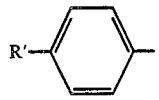

where R' is a primary, secondary or tertiary alkyl group containing 8 to 12 carbon atoms, and y is a cardinal number of from 8 to 14, where both are present in an aqueous mixture, which comprise:

A. extracting the fluoroalkanoate salt (in the form of its corresponding acid) and the ethoxylated compound from an acidified aqueous mixture containing both by agitating the aqueous mixture with a chlorinated hydrocarbon organic liquid selected from dichloromethane or trichloromethane and separating the organic liquid layer, B. (1) contacting said organic liquid layer with activated alumina whereby the fluoroalkanoic acid is adsorbed onto the alumina, and separating the organic liquid and the alumina, B. (2) contacting the alumina with ammonium hydroxide to remove the fluoroalkanoic acid from the alumina, C. boiling off the organic liquid obtained in step B.(1) until the ethoxylated compound remains, D. (1) acidifying the ammonium hydroxide solution obtained in step B.(2) until the pH of the solution is 1 or less and isolating the denser organic phase from the lighter aqueous phase formed, D. (2) steam distilling the organic phase after acidifying it with a mineral acid until the weight ratio of mineral acid to water is at least 1:1, and collecting the organic portion, D. (3) steam distilling said organic portion in the combined presence of a mineral acid, present in a weight ratio of mineral acid to water of at least 1:1 and a non-volatile oxidizing agent, and collecting the fluoroalkanoic acid distilled.

* * * * *